United States Patent [19]
Sharp et al.

[11] Patent Number: 5,307,243
[45] Date of Patent: Apr. 26, 1994

[54] WIRE MANAGEMENT ASSEMBLY FOR AN ELECTRICAL DISTRIBUTION HOUSING

[75] Inventors: Jeffrey O. Sharp; Richard Korthauer, both of Lexington, Ky.

[73] Assignee: Square D Company, Palatine, Ill.

[21] Appl. No.: 969,643

[22] Filed: Oct. 30, 1992

[51] Int. Cl.[5] ............................................. H02B 1/20
[52] U.S. Cl. .................................. 361/826; 174/65 G; 174/153 G; 439/457
[58] Field of Search ........................... 361/331–333, 361/346–358, 361, 363, 376, 428; 174/65 R, 65 G, 59, 60, 153 G; 439/457

[56] References Cited

U.S. PATENT DOCUMENTS 3,852,514  12/1974  Lauben ............................... 361/357

FOREIGN PATENT DOCUMENTS

| | | | |
|---|---|---|---|
| 621632 | 12/1962 | Belgium ........................ | 174/153 G |
| 3032249 | 4/1982 | Fed. Rep. of Germany .... | 174/65 R |
| 3500655 | 7/1986 | Fed. Rep. of Germany .... | 174/65 R |
| 6712453 | 4/1968 | Netherlands ..................... | 174/65 R |

*Primary Examiner*—Gregory D. Thompson
*Attorney, Agent, or Firm*—Larry I. Golden; Kareem M. Irfan

[57] ABSTRACT

The present invention provides an electrically-insulating wire management assembly for a metallic electrical distribution device housing. The assembly includes at least one slot having a generally v-shaped length formed at an angle through the cross-section of the assembly's body. Each slot is arranged to receive a flexible electrical conductor through one open side edge of the body and guide the conductor entering through the outer face of the body, across the length of the slot, and exiting through the inner face of the body into the housing interior. The angle of each slot is adapted to provide an interference fit with the conductor. The assembly includes means for securing the assembly to the side wall of the housing in a position allowing the conductor to enter the housing through the assembly. The present invention also includes an electrical distribution device housing adapted for connecting with a wire management assembly. The housing including at least one knock-out or cut-out integrally formed in at least one side wall. Each knock-out or cut-out extends downwardly from the upper edge of the side wall and corresponds in shape to the wire management assembly.

26 Claims, 3 Drawing Sheets

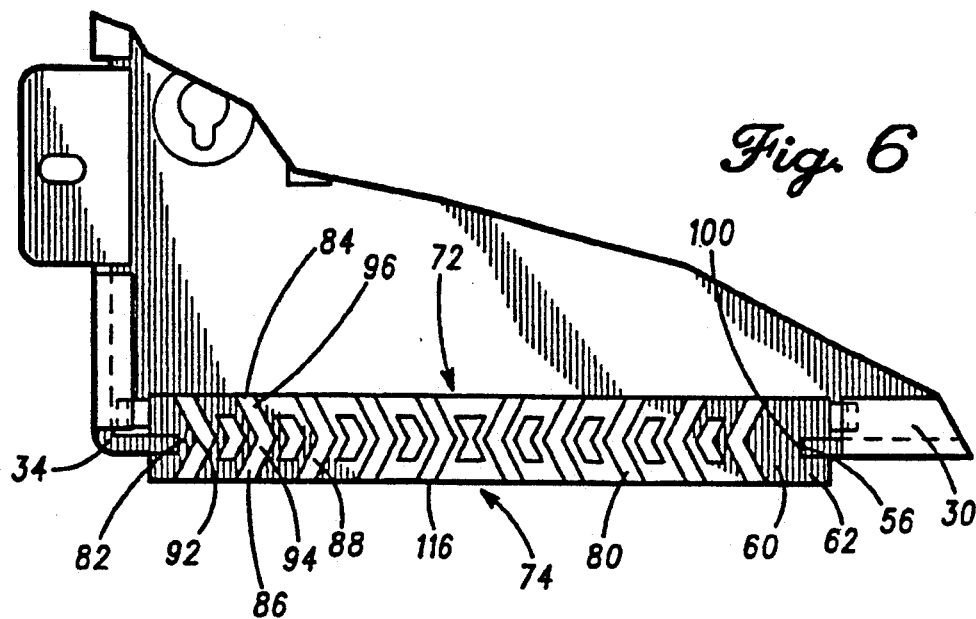
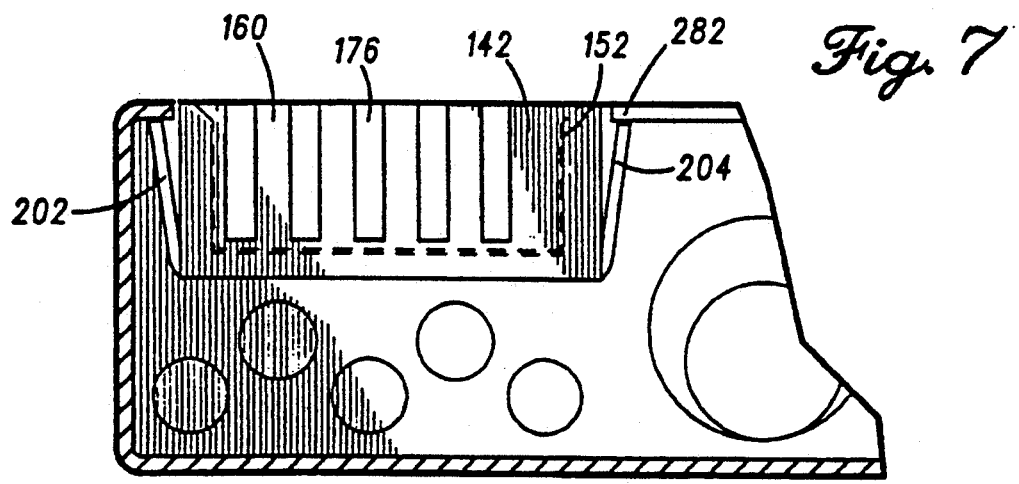

WIRE MANAGEMENT ASSEMBLY FOR AN ELECTRICAL DISTRIBUTION HOUSING

FIELD OF THE INVENTION

The present invention relates to panelboards, load centers, electrical distribution devices, and the like, which have a metallic housing and, more particularly, to an electrically-insulating assembly secured to the housing which retains wire conductors entering the housing in a prescribed position.

BACKGROUND OF THE INVENTION

The majority of enclosures for electrical equipment, such as circuit breakers, panelboards or load centers, are formed of metal. These metallic enclosures are usually mass-produced from metal sheets in successive forming operations like cutting, blanking, and welding to make a box-like housing and cover. The enclosure is usually zinc-coated and painted. Various panels or other supports are assembled in the enclosure for mounting components or other elements for electrical distribution. Since the metallic enclosure is electrically conductive, insulators must be used for mounting the various bus bars within the enclosure.

In recent years, there has been significant utilization of plastic load center enclosures. For example, U.S. Pat. Nos. 4,909,551, 5,072,071 and 5,134,543, commonly assigned to the Square D Company, disclose a non-metallic, molded plastic, load center enclosure with a snap-fitted, circuit breaker bus bar support panel. Integrally formed with a side wall of the enclosure is a conductor mounting member with a v-shaped wire bending fixture to secure wires entering the load center. Since the entire enclosure is plastic and, thus, the conductor mounting member as well, there is no danger of shorting the wires.

There is a need to provide similar protection to the metallic enclosures. Wires usually enter a metallic enclosure through a "knock-out" which is a simple hole covered by a blank until it is punched out with a hammer and screwdriver or the like. The knock-out does not secure the wires to the enclosure wall. Multi-piece clamps must be assembled and attached to the wires for securing to the enclosure. These clamps are typically not provided by the manufacturer of the enclosure and also require wire clamping screws located on the exterior of the enclosure. Accordingly, a need exists to combine the advantages of an electrically-insulating wire management assembly with a metallic load center.

SUMMARY OF THE INVENTION

According to the present invention, a wire management assembly is provided for an electrical distribution device housing having a back wall with upstanding side walls formed therewith. The assembly includes a generally flat planar body made of electrically-insulating material. The body is defined by two side edges and two end edges with an outer face and an inner face.

The assembly also includes at least one slot having a generally v-shaped length formed at an angle through the cross-section of the body. Each slot has one end open to the inner face of the body and the opposite end open to the outer face. Each slot length is open on one side extending from one open side edge of the body partially across the length of the body towards the opposite side edge. Each slot is arranged to receive a flexible electrical conductor through one open side edge of the body and guide the conductor entering through the outer face of the body, across the length of the slot, and exiting through the inner face of the body into the housing interior. The angle of each slot is adapted to provide an interference fit with the conductor.

The assembly further includes means for securing the assembly to the side wall of the housing in a position allowing the conductor to enter the housing through the assembly. Preferably, a spring-biased arm provides a detachable snap arrangement to secure the assembly to the side wall.

The present invention also provides an electrical distribution device housing adapted for connecting with a wire management assembly. The housing includes a back wall formed with upstanding side walls and at least one knock-out integrally formed in at least one side wall. Each knock-out extends downwardly from the upper edge of the side wall and corresponds in shape to the wire management assembly. Each knock-out is removable from the housing to provide a cut-out portion in the side wall corresponding in shape to the knock-out. The cut-out is adapted to engage and secure the wire management assembly. Preferably, a wire management assembly of the type described herein is utilized.

The present invention includes another electrical distribution device housing adapted for connecting with a wire management assembly. The housing includes a back wall formed with upstanding side walls and at least one cut-out portion formed in at least one side wall. Each cut-out is defined by two side edges extending downwardly from the upper edge of the side wall to intersect a bottom edge. Each cut-out corresponds in shape to the wire management assembly. The cut-out is adapted to engage and secure the wire management assembly. Preferably, a wire management assembly of the type described herein is utilized.

Furthermore, the present invention includes an electrical distribution device. The device includes a housing defined by a back wall formed with upstanding side walls. The housing is made of metallic material.

The device also includes a wire management assembly having a generally flat planar body made of electrically-insulating material. The body is defined by two side edges and two end edges with an outer face and an inner face.

The device further includes at least one slot having a generally v-shaped length formed at an angle through the cross-section of the body. Each slot has one end open to the inner face of the body and the opposite end open to the outer face. Each slot length being open on one side extending from one open side edge of the body partially across the length of the body towards the opposite side edge. Each slot is arranged to receive a flexible electrical conductor through one open side edge of the body and guide the conductor entering through the outer face of the body, across the length of the slot, and exiting through the inner face of the body into the housing interior. The angle of each slot is adapted to provide an interference fit with the conductor. Means is also included for securing the assembly to the side wall of the housing in a position allowing the conductor to enter the housing through the assembly.

An object of the present invention is to provide a wire management assembly for securing wires entering an enclosure for an electrical distribution device.

Another object of the invention is to provide an electrically-insulating assembly which can retain electrical conductors and, yet, prevent an electric hazard from forming if the insulation of the wire is defective or damaged.

A further object of the invention is to provide a wire management assembly for a metallic enclosure which secures wires with an interference fit rather than complicated clamping assemblies.

Yet another object of the invention is to provide a method of manually securing wires entering a load center enclosure quickly and easily without special tools.

A still further object of the invention is to provide a wire management assembly which automatically directs wires entering a load center enclosure toward the desired side of the enclosure.

Another object of the invention is to provide an a wire management assembly for the side wall of a electrical distribution enclosure which can accommodate a large number of wires in a small amount of surface area allowing room on the same side wall for knock-outs providing large wire accessibility.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure:

FIG. 6 is an enlarged partial top plan view of the wire management assembly in combination with the side wall of the load center housing of FIG. 3; and FIG. 7 is an enlarged partial cross-sectional view of a wire management assembly in combination with the side wall of the load center housing of FIG. 5.

DETAILED DESCRIPTION

Figure 1:
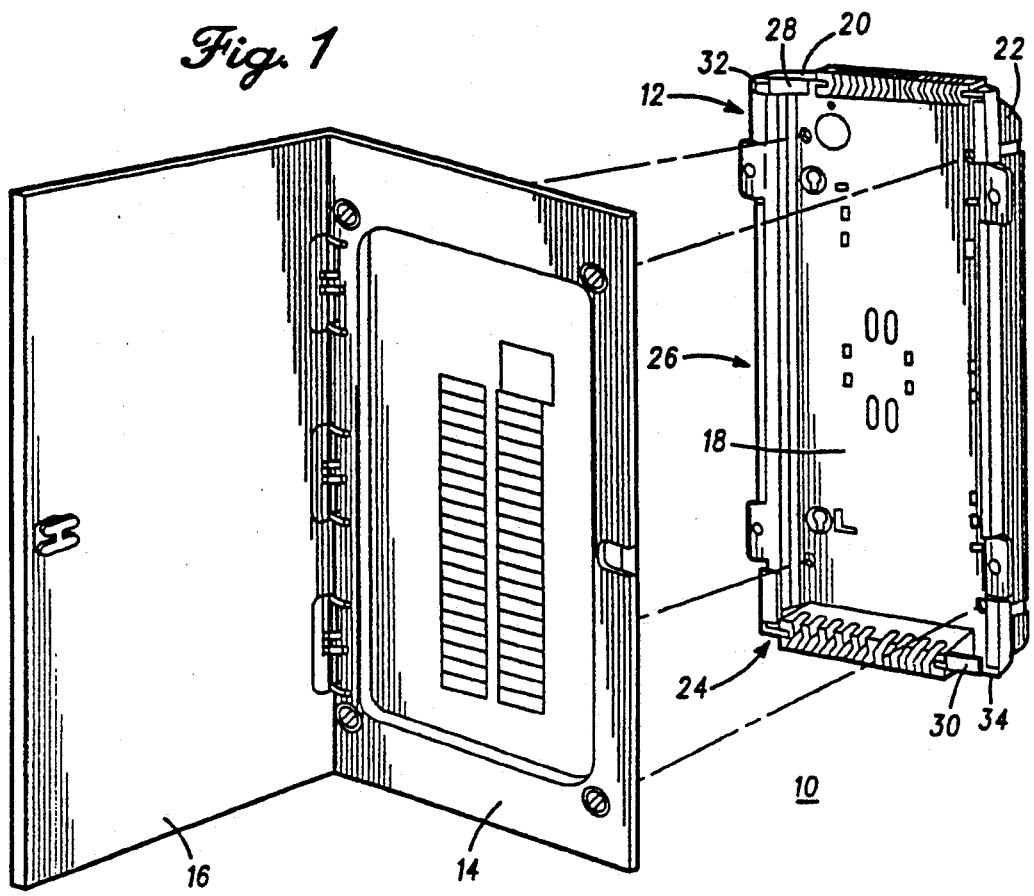
FIG. 1 is a perspective view of one embodiment of the wire management assembly of the present invention shown in combination with a partially disassembled load center housing.
Figure 4:
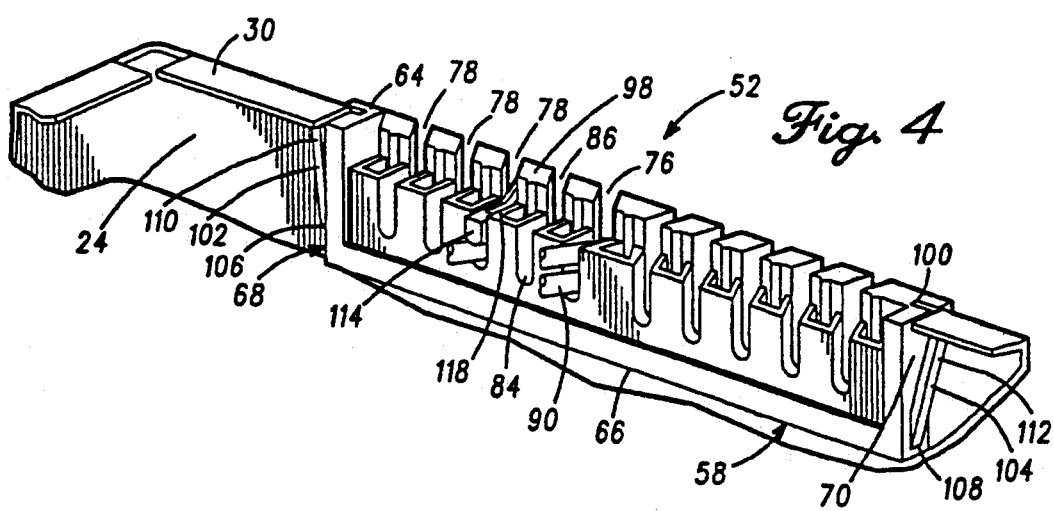
FIG. 4 is an enlarged fragmentary perspective view of the wire management assembly in combination with the side wall of the load center housing of FIG. 3.

Referring to the drawings, FIGS. 1 through 7 illustrate a load center or panel board, generally designated by reference numeral 10, consisting of an enclosure or housing 12, a molded internal circuit breaker bus bar support panel with bus bars (not shown), a trim panel 14 with a cover 16 hinged thereto.

The housing 12 is defined by a back wall 18 formed with upstanding side walls 20, 22, 24, and 26. The side walls like 20 and 24 have a planar flange 28 and 30 extending perpendicularly and inwardly from the upper edges 32 and 34 of the respective side walls. The flanges 28, 30 extend toward the interior of the enclosure. The housing 12 has a pair of mounting flanges 36, 38 extending outwardly from the upper edges 40, 42 of the side walls. The housing 12 is also designed for surface mounting on a wall with a plurality of holes 44 in the back wall 18.

The housing 12 is preferably made of metal such as corrosion resistant zinc coated sheet metal with an electrostatically deposited paint finish. A removable "knock-out," like 46 and 48, is provided in the back wall and side walls to provide access for large round wire conductors. Preferably, the side walls like 20 also have a knock-out opening 50 providing a main cable entrance. The knock-out openings 46, 50 have a smaller segment and a larger segment for receiving main cables of different sizes.

The side wall 24 has a cut-out 52 defined by two side edges 54, 56 and a bottom edge 58. The shape and size of the cut-out 52 is adapted to insert a wire management assembly 60 therein. The cut-out 52 is pre-fabricated when the housing 12 is manufactured. Alternately, the housing 12 is made with a knock-out in the size and shape of the cut-out 52. Then the cut-out 52 is fabricated in the field by removing the knock-out. As discussed above, the knock-out can include multiple segments to accept wire management assemblies of different sizes or shapes.

The assembly 60 includes a generally flat planar body 62 defined by two side edges 64, 66 and two end edges 68, 70. The body has an inner face 72 and an outer face 74.

The assembly 60 includes at least one slot 76 and, preferably, a plurality of slots like 78. Each slot 76 has a generally v-shaped length 80 formed at an angle 82 through the cross-section of the body 62. One end 84 of the slot is open to the inner face 72 of the body and the opposite end 86 of the slot is open to the outer face 74 of the body. The slot length 80 is open on one side 88 extending from one open side edge 64 of the body partially across the length of the body 62 towards the opposite side edge 66.

Each slot 76 is arranged to receive a flexible electrical conductor 90 through one side edge 64 of the body. As the conductor 90 is bent appropriately and pressed into the slot 76, the slot 76 acts as a guide for the conductor 90 to enter at and through the outer face 74. Then the conductor 90 passes across the length 80 of the slot to exit through the inner face 72 of the body into the housing's 12 interior.

The angle 82 of each slot is adapted to provide an interference fit with the conductor 90 placed in each slot 76. Depending on the inner composition of the conductor 90 and its insulation, the angle 82 must be sufficiently great to avoid cutting into the insulation when the conductor 90 is mounted in the slot 76. On the other hand, the angle 82 must be sufficiently small to firmly retain the conductor 90 and prevent it from slipping. Preferably, the angle 82 is about 120 degrees when commercially available NM-B standard cable is used and the vertex 92 of the v-shaped slot forms a point.

In the preferred embodiment, the slot 76 has an outer leg portion 94 extending from the outer face 74 of the body to the vertex 92 and an inner leg portion 96 extending from the inner face 72 of the body to the vertex 92. The outer leg portion 94 extends upwardly farther than the inner leg portion 96 to form a wire bending fixture 98. During mounting, the conductor 90 is first bent to the appropriate angle 82 of the slot 76 about one of the wire bending fixtures 98. Then the conductor 90 is pressed into the one of the slots 76. The inner leg portion 96 of the slots are directed toward the nearest side walls 22 or 26 of the housing so that the conductors are automatically managed or directed toward the appropriate side of the housing 12.

The assembly 60 also includes means for securing the body 62 to the side wall of the housing 12 in a position allowing the conductor 90 to enter the housing 12 through the assembly 60. Preferably, a channel 100 is formed in the opposite side edge 66 and the end edges 68, 70 of the body. The channel 100 is adapted to receive the side edges 54, 56 and the bottom edge 58 of the cutout in the side wall of the housing. While inserting the assembly 60 into the cut-out 52, the channel 100 first engages the side edges 64, 66 of the cut-out. Then, the body 62 slides downwardly and the bottom edge 58 of the cut-out engages the channel 100. Each end edge 68, 70 of the body includes an arm 102, 104 which is hingedly connected at arm ends 106, 108. The arms 102, 104 are spring-biased to extend the other ends 110, 112 of the arms outwardly away from the end edges 68, 70 of the body. The other ends 110, 112 of the arms are adapted to engage the underside of the flange 30 on the upper edge 34 of the side wall in an abutting arrangement. During the inserting of the assembly 60 into the cut-out 52, the body 62 slides downwardly to engage the bottom edge 58 of the cut-out, the arms 102, 104 are in a retracted position parallel to the end edges 68, 70 of the body. Once the bottom edge 58 of the body engages the channel 100, the other ends 110, 112 of the arms clear the flange 30 and spring outwardly to abut the underside of the flange 30. The body 42 is detachable from the side wall 24 by manually bending the other ends 110, 112 of the arms inward and sliding the body 42 upwardly.

The present invention contemplates using other types of fasteners to secure the assembly 60 to the side wall 20 of the housing. Screws, rivets, bolts, or other mechanical fasteners are suitable. These types of fasteners are more cumbersome to use than the arms 102, 104 illustrated and are less likely to be detachable. Another securing means utilizes a simple interference or press-fit along the length of the channel 100 engaging the edges 54, 56, and 58 of the cut-out. Other shapes which interlock such as, but not limited to, a tongue and groove combination or a tab and slot combination are also suitable securing means to engage the assembly 60 to the side wall 24 of the enclosure.

The invention also contemplates reversing position of the securing means. For example, the channel 100 is reversed from the body 62 to form it along the edges 54, 56, and 58 of the cut-out. In this example, the end edges 68, 70 and the side edge 66 of the body insert into the channel instead.

The assembly 60 illustrated is sized to secure two NM-B flexible cable conductors, such as ROMEX (trademark) conductor cables distributed by the Rome Cable Company for lower amperage circuits, such as 30 amps or less. When two NM-B conductors are inserted like 90, one on top of the other, the top conductor extends upwardly to approximately the top of the inner leg portion 96. Should only one conductor be required in the slot 76, a v-shaped filler plug 114 is inserted in the base of the particular slot 76 to fill the space otherwise occupied by a conductor 90.

Preferably, each slot 78 is initially covered with a knock-out member 116 until needed. If the knock-out member 116 is removed and no conductors are inserted into the slot 78, two filler plugs like 114 are utilized. The filler plugs 114 do not extend beyond the upper edge 118 of the outer leg portion 94 of the slot to avoid interference with the closing of the cover 16 over the housing as seen in FIG. 1.

The filler plug 114 is shaped to correspond to the shape of the slot length 80. Preferably, the filler plug 114 is retained in the slot 76 by making the plug 114 with an angle slightly larger or smaller than the angle 82 of the slot to provide an interference fit therewith.

Figure 2:
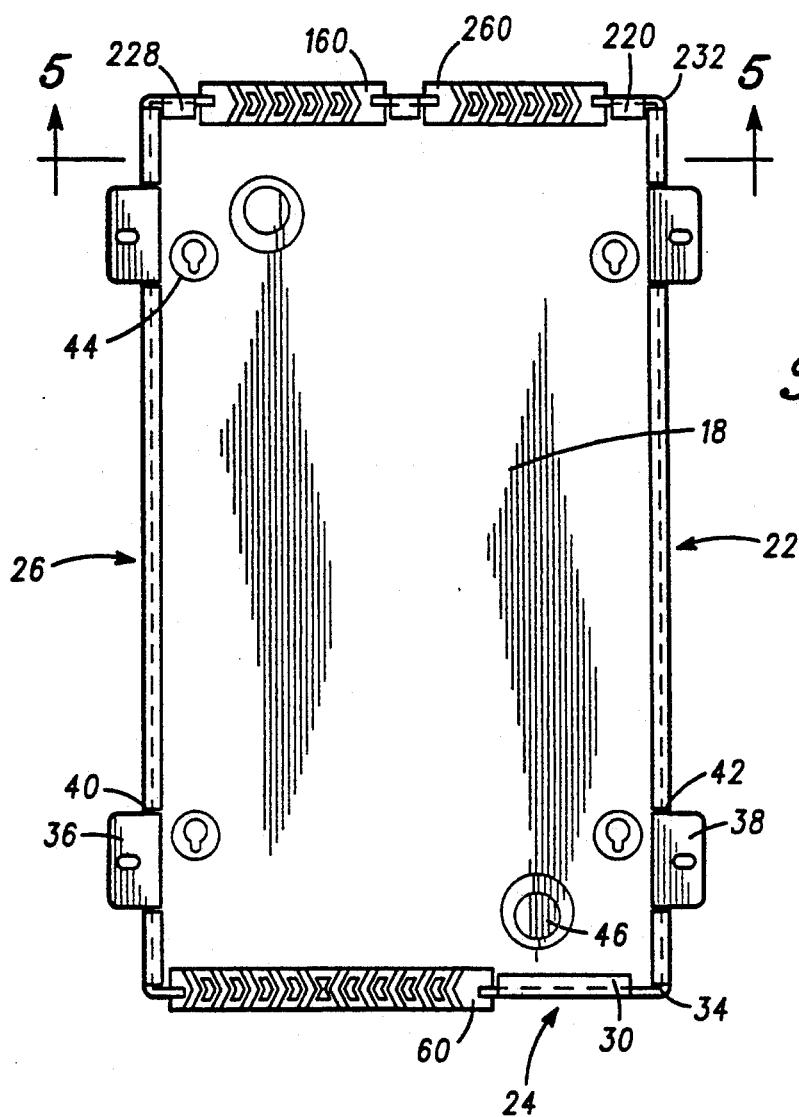
FIG. 2 is a front plan view of another embodiment of a wire management assembly of the present invention assembled with a load center housing.
Figure 3:
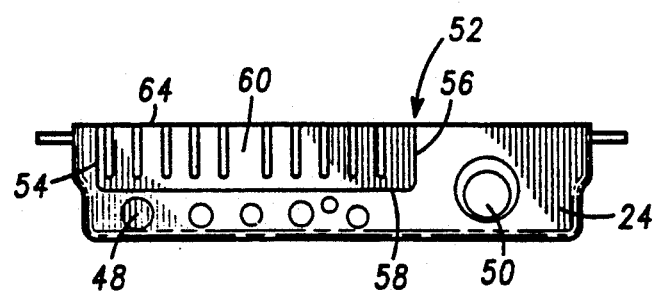
FIG. 3 is a bottom end view of the wire management assembly of FIG. 2 assembled with a load center.
Figure 5:
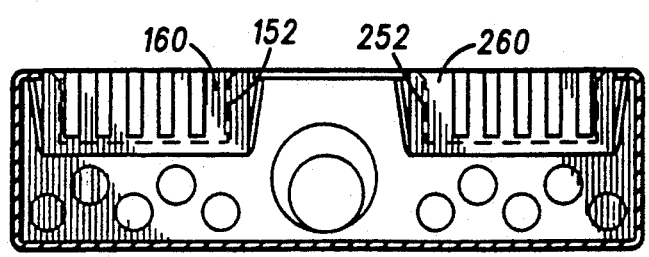
FIG. 5 is a cross-sectional view of the load center housing side wall assembled with a wire management assembly along line 5—5 of FIG. 2.

As illustrated in FIGS. 2, 5 and 7, the present invention contemplates using multiple cut-outs like 152 and 252 in a variety of positions on a side wall 220. The cut-outs 152, 252 extend through the flange 228 on the upper edge 232 of the side wall. Another embodiment of the present invention is illustrated in these FIGS. with assemblies 160 and 260. Similar reference numerals are used for like parts between the assembly 60 and the assemblies 160 and 260. In a manner similar to the securing means previously discussed, FIG. 7 illustrates the assembly 160 securing the body 142 having slots like 176 into the cut-out 152 by the spring-biased arms 202, 204 engaging the flange 228.

All of the slots 176 are directed toward the nearest side wall 26 of the housing so that the conductors placed therein are automatically managed or directed toward the appropriate side of the housing 12. The orientation of all the slots 176 in one direction differs from the split orientation illustrated with assembly 60 in FIG. 6. This demonstrates the flexibility of the present invention to have an embodiment customized to manage the conductors in virtually any desired direction.

The cut-outs 52, 152 and 252 are pre-determined at the factory. Alternately, a knock-out member in the size and shape of the assembly 60 is provided at various locations along the side walls 20, 22, 24, and 26 of the housing. As previously discussed, multiple knock-out segments provide the most variety in accommodating various assemblies with a customized installation that is accomplished in the field. The knock-out member preferably extends across the flange 30 to provide an appropriate securing point.

It should be understood that although a particular size of conductor 90 is illustrated and described, the present invention is suitable for use with conductors of other sizes. Each slot 76 is appropriately sized to accommodate only one conductor or a plurality of conductors.

Similarly, each wire management assembly can include slots having different dimensions to accommodate conductors of different sizes in the same assembly. In this embodiment, at least one second type of slot having a different width than the first slot is included in the assembly. Each second type of slot is defined by a generally v-shaped length formed at an angle through the cross-section of the body. The second slot has one end open to the inner face of the body and the opposite end open to the outer face. The second slot length is open on one side extending from one open side edge of the body partially across the length of the body towards the opposite side edge. In the manner previously discussed, each second slot is arranged to receive a flexible electrical conductor through one open side edge of the body and guide the conductor entering through the outer face of the body, across the length of the second slot, and exiting through the inner face of the body into the housing interior. The angle of each second slot is adapted to provide an interference fit with the conductor.

The assemblies 60, 160, and 260 of the present invention are made of an electrically-insulating material such as a thermoplastic. Preferably, the material utilized is NORYL-N190 (trademark) produced by the General Electric Company. Other plastics similar to the NORYL-N190 but with a lower temperature rating are also suitable for use with the invention. Since the assembly is not positioned close to the bus bars where most of the heat is generated, the material used for the assembly can have a lower rating than a housing made of all plastic as described above.

As can be understood from the above description of the present invention, the assembly eliminates the need for separately purchased wire clamps or having to feed or pull conductors through knock-out openings as is typical in the endwalls of load center enclosures. Furthermore, the assembly allows the conductors to be stripped of their insulation prior to insertion in the slots. This avoids the more difficult step of stripping insulation from a conductor already clamped to the enclosure.

While particular embodiments and applications of the present invention have been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed is:

1. A wire management assembly for an electrical distribution device housing having a back wall with upstanding side walls formed therewith, the assembly comprising:
   a generally flat planar body made of electrically-insulating material, the body defined by two side edges and two end edges with an outer face and an inner face;
   at least one slot of a first type having a generally v-shaped length formed at an angle through the cross-section of the body, each such slot having one end open to the inner face of the body and the opposite end open to the outer face, each such slot length being open on one side extending from one open side edge of the body partially across the length of the body towards the opposite side edge, whereby, each such slot is arranged to receive a flexible electrical conductor through one open side edge of the body and guide the conductor entering through the outer face of the body, across the length of each such the slot, and exiting through the inner face of the body into the housing interior, the angle of each such slot being adapted to provide an interference fit with the conductor; and
   means for securing the assembly in a position allowing the conductor to enter the housing through the assembly, the securing means adapted to secure to one of the side walls of the housing.

2. The assembly of claim 1 wherein the angle of each v-shaped slot includes a vertex forming a point.

3. The assembly of claim 1 wherein the angle of each v-shaped slot is about 120 degrees.

4. The assembly of claim 1 wherein the inner face end of each slot is positioned in the direction of the closest adjacent side wall of the housing so as to automatically direct the conductor placed in the slot to the closest side wall of the housing.

5. The assembly of claim 1 wherein the assembly further includes a conductor bending fixture formed from an outer leg portion of each slot between the vertex of the angle and the outer face, the outer leg portion extending upwardly further than an inner leg portion of each slot between the vertex of the angle and the inner face.

6. The assembly of claim 1 wherein the first type slots are equally spaced apart from one another across the length of the open side edge of the body.

7. The assembly of claim 1 wherein the assembly further includes at least one second type of slot having a different width than the first type slots, each such second type of slot having a generally v-shaped length formed at an angle through the cross-section of the body, each such second type slot having one end open to the inner face of the body and the opposite end open to the outer face, each such second type slot length being open on one side extending from one open side edge of the body partially across the length of the body towards the opposite side edge, whereby, each such second type slot is arranged to receive a flexible electrical conductor through one open side edge of the body and guide the conductor entering through the outer face of the body, across the length of each such second type slot, and exiting through the inner face of the body into the housing interior, the angle of each such second type slot being adapted to provide an interference fit with the conductor.

8. The assembly of claim 1 wherein the assembly further includes a removable plug corresponding in size and shape to the length of each first type slot whereby the plug is complementarily received by each first type slot in the portion left unoccupied by a conductor.

9. The assembly of claim 1 wherein the securing means includes a channel formed longitudinally in both end edges and in the side edge of the body opposite each first type slot, the channel adapted to engage one of the side walls of the housing.

10. The assembly of claim 9 wherein the engagement between the channel and one of the side walls of the housing is an interference fit.

11. The assembly of claim 9 wherein the securing means further includes each end edge having a retractable arm hingeably connected thereto, each arm adapted to engage a corresponding flange on the housing.

12. The assembly of claim 1 wherein the securing means includes a fastener adapted to connect the body to one of the side walls of the housing.

13. The assembly of claim 12 wherein the fastener is an arm having a spring-biased hinge connection to each end edge of the body, each arm adapted to engage a corresponding flange extending inwardly from the side wall of the housing.

14. An electrical distribution device comprising:
   a housing defined by a back wall formed with upstanding side walls, the housing made of metallic material;
   a wire management assembly having a generally flat planar body made of electrically-insulating material, the body defined by two side edges and two end edges with an outer face and an inner face;
   at least one slot of a first type having a generally v-shaped length formed at an angle through the cross-section of the body, each such slot having one end open to the inner face of the body and the opposite end open to the outer face, each such slot length being open on one side extending from one open side edge of the body partially across the length of the body towards the opposite side edge, whereby, each such slot is arranged to receive a flexible electrical conductor through one open side edge of the body and guide the conductor entering through the outer face of the body, across the length of the slot, and exiting through each such inner face of the body into the housing interior, the angle of each such slot being adapted to provide an interference fit with the conductor; and means for securing the assembly to the side wall of the housing in a position allowing the conductor to enter the housing through the assembly.

15. The assembly of claim 14 wherein the angle of each v-shaped slot includes a vertex forming a point.

16. The assembly of claim 14 wherein the angle of each v-shaped slot is about 120 degrees.

17. The assembly of claim 14 wherein the inner face end of each slot is positioned in the direction of the closest adjacent side wall of the housing so as to automatically direct the conductor placed in the slot to the closest side wall of the housing.

18. The assembly of claim 14 wherein the assembly further includes a conductor bending fixture formed from an outer leg portion of each slot between the vertex of the angle and the outer face, the outer leg portion extending upwardly further than an inner leg portion of each slot between the vertex of the angle and the inner face.

19. The assembly of claim 14 wherein the first type slots are equally spaced apart from one another across the length of the open side edge of the body.

20. The assembly of claim 14 wherein the assembly further includes at least one second type of slot having a different width than the first type slots, each such second type of slot having a generally v-shaped length formed at an angle through the cross-section of the body, each such second type slot having one end open to the inner face of the body and the opposite end open to the outer face, each such second type slot length being open on one side extending from one open side edge of the body partially across the length of the body towards the opposite side edge, whereby, each such second type slot is arranged to receive a flexible electrical conductor through one open side edge of the body and guide the conductor entering through the outer face of the body, across the length of each such second type slot, and exiting through the inner face of the body into the housing interior, the angle of each such second type slot being adapted to provide an interference fit with the conductor.

21. The assembly of claim 14 wherein the assembly further includes a removable plug corresponding in size and shape to the length of each first type slot whereby the plug is complementarily received by each first type slot in the portion left unoccupied by a conductor.

22. The assembly of claim 14 wherein the securing means includes a channel formed longitudinally in both end edges and in the side edge of the body opposite each first type slot, the channel adapted to engage each side wall of the housing.

23. The assembly of claim 22 wherein the engagement between the channel and one of the side walls of the housing is an interference fit.

24. The assembly of claim 22 wherein the securing means further includes each end edge having a retractable arm hingeably connected thereto, each arm adapted to engage a corresponding flange on the housing.

25. The assembly of claim 14 wherein the securing means includes a fastener connecting the body to one of the side walls of the housing.

26. The assembly of claim 25 wherein the fastener is an arm having a spring-biased hinge connection to each end edge of the body, each arm adapted to engage a corresponding flange extending inwardly from the side wall of the housing.

* * * * *